(12) United States Patent
Kapoor et al.

(10) Patent No.: US 8,374,210 B2
(45) Date of Patent: Feb. 12, 2013

(54) WIDE BAND TRANSCEIVER AND DATA RECEIVING METHOD USING A TUNABLE NOTCH FILTER AND PRE-ESTIMATED OPTIMAL NOTCH FILTER PARAMETERS

(75) Inventors: Ajay Kapoor, Wijchen (NL); Maurice Stassen, Eindhoven (NL); Jozef Reinerus Maria Bergervoet, Eindhoven (NL); Harish Kundur Subramaniyan, Eindhoven (NL)

(73) Assignee: NXP B.V., Eindhoven (NL)

( * ) Notice: Subject to any disclaimer, the term of this patent is extended or adjusted under 35 U.S.C. 154(b) by 101 days.

(21) Appl. No.: 13/058,565

(22) PCT Filed: Aug. 6, 2009

(86) PCT No.: PCT/IB2009/053425
§ 371 (c)(1),
(2), (4) Date: May 6, 2011

(87) PCT Pub. No.: WO2010/018492
PCT Pub. Date: Feb. 18, 2010

(65) Prior Publication Data
US 2011/0206100 A1    Aug. 25, 2011

(30) Foreign Application Priority Data

Aug. 13, 2008 (EP) ..................... 08105036

(51) Int. Cl.
*H04B 1/00* (2006.01)

(52) U.S. Cl. ...................................... 375/130

(58) Field of Classification Search ............. 375/130
See application file for complete search history.

(56) References Cited

U.S. PATENT DOCUMENTS 6,035,000 A * 3/2000 Bingham ................. 375/296
(Continued)

FOREIGN PATENT DOCUMENTS

| EP | 0 812 069 A2 | 12/1997 |
| GB | 2 394 373 A | 4/2004 |

OTHER PUBLICATIONS

Kapoor, S., et al. "Interference Suppression in DMT Receivers Using Windowing", IEEE Int'l. Conf. on Communications, vol. 2, pp. 778-782 (Jun. 2000).

(Continued)

*Primary Examiner* — Erin File

(57) ABSTRACT

Data is received with a transceiver circuit with a receiver branch (14) that comprises a notch filter (140) and a digital Fourier transformer (146). Furthermore the transceiver circuit has a transmitter branch (16) comprising an inverse digital Fourier transformer (160). Prior to reception the transceiver circuit is switched to a calibration mode, wherein an output of the transmitter branch (16) is coupled to an input of the notch filter (140). The inverse digital Fourier transformer (160) of the transmitter is used to compute an inverse transform of a spectrum with a frequency component at a selected position. A signal derived from the inverse transform is applied to an input of the notch filter (140) in the calibration mode. The digital Fourier transformer (146) is used to Fourier transform an output signal of the notch filter (140). A control setting of the notch filter to suppress the frequency component from an output of the digital Fourier transformer (146) is determined. A parameter derived from said control setting is stored in a memory (149*a*). After the transceiver circuit is switched to a reception mode, a received interfering signal and an interference frequency of the received interfering signal are detected. The stored parameter to translate the detected interference frequency into a control setting of the notch filter (140).

12 Claims, 2 Drawing Sheets

U.S. PATENT DOCUMENTS

| | | | |
|---|---|---|---|
| 6,631,165 B1* | 10/2003 | Lambert et al. | 375/259 |
| 7,039,385 B1 | 5/2006 | Hoffmann et al. | |
| 7,492,814 B1* | 2/2009 | Nelson | 375/227 |
| 2004/0190731 A1* | 9/2004 | Luo et al. | 381/93 |
| 2005/0047486 A1 | 3/2005 | Sakaue et al. | |
| 2006/0205346 A1* | 9/2006 | Evans et al. | 455/12.1 |
| 2007/0082638 A1 | 4/2007 | Panfilov et al. | |
| 2007/0133387 A1 | 6/2007 | Arslan et al. | |
| 2007/0140391 A1 | 6/2007 | Pan | |
| 2008/0143580 A1* | 6/2008 | Glazko et al. | 342/17 |
| 2009/0042524 A1* | 2/2009 | Maiuzzo | 455/188.1 |
| 2010/0195744 A1* | 8/2010 | Schwager et al. | 375/257 |

OTHER PUBLICATIONS

Kelleci, B. et al. "Narrowband Interference Suppression in Multi-band OFDM Ultra Wideband Communications Systems: A Mixed-Mode Approach", Digital Signal Processing Workshop, 12$^{th}$—Signal Processing Education Workshop, pp. 55-59 (Sep. 2006).

Yang, J., et al., "Addressing the Dynamic Range Problem in Cognitive Radios", IEEE Int'l. Conf. on Communications, pp. 5183-5188 (Jun. 1, 2007).

International Search Report and Written Opinion for Int'l. Patent Application No. PCT/1B2009/053425 (Dec. 9, 2009).

\* cited by examiner

WIDE BAND TRANSCEIVER AND DATA RECEIVING METHOD USING A TUNABLE NOTCH FILTER AND PRE-ESTIMATED OPTIMAL NOTCH FILTER PARAMETERS

FIELD OF THE INVENTION

The invention relates to a wide band transceiver and to a method of using such a transceiver.

BACKGROUND OF THE INVENTION

An ultra wide band (UWB) receiver with an adaptable analog notch filter is known from an article by Burak Kelleci et al, titled "Narrowband interference suppression in multi-band OFDM ultra wideband communication systems: a mixed mode approach" published in the Digital Signal Processing Workshop, 12th—Signal Processing Education Workshop, $4^{th}$ Volume , Issue , September 2006 Page(s):55-59. Kelleci describes a receiver made up of the adaptable analog notch filter, followed successively by an AGC circuit (Automatic Gain Control circuit) and ADC (Analog to Digital Converter), FFT processor (Fast Fourier Transform) a digital filter and a demodulator. An adaptable "notch filter" is a filter with a frequency dependent response with a zero or near zero response at an adaptable, isolated frequency. The demodulator demodulates data using phase and amplitude values of frequency components computed by the FFT processor.

Furthermore, an output of the FFT processor is used to determine the frequency of a narrow band interfering signal. This information is used to control the notch frequency of the adaptable analog notch filter, so that the amount of power of the narrow band interfering signal that enters the signal chain is minimized. In addition the frequency of a narrow band interfering signal is signaled to the digital filter, which removes the frequency components at the frequency of the narrow band interfering signal.

Kelleci et al describe the filtering operation as a subtraction of a unity gain narrowband filtered signal from a unity gain wide band filtered signal. The resulting frequency response is symmetric across DC Kelleci et al describe an iterative tuning process to learn the mapping from the digital information about the frequency of the narrow band interference signal to the setting of the analog notch filter characteristics. An initial calibration factor is applied to the digitally measured frequency in order to select a setting of the notch filter. The calibration factor is iteratively increased or decreased until a maximum suppression of the narrow band interference signal is achieved.

Kelleci et al. also describe that the notch filter may be periodically switched off to determine whether the narrow band interfering signal has disappeared.

OBJECT AND SUMMARY OF THE INVENTION

Among others it is an object to provide for a receiver circuit wherein reliable tuning of the notch is realized faster.

A wide band transceiver according to claim 1 is provided herein a loop-back circuit between a transmitter branch and a reception branch that contains a tunable analog notch filter. The reception branch has a Fourier transformer that may be used for demodulating data from received signals, for example in an OFDM technique. The transmitter branch has an inverse Fourier transformer that may be used for modulation. Control circuitry switches the transceiver to a calibration mode, wherein a parameter for tuning the notch filter is determined from a response of the Fourier transformer at a selected frequency position to a signal from the transmitter branch generated by the inverse digital Fourier transformer with a frequency component at the selected frequency position. The parameter is stored for use to tune the notch filter during a normal operating mode, dependent on an interference frequency detected in an output signal of the Fourier transformer. The stored parameter enables faster tuning, based on a simple and reliable calibration.

In an embodiment in phase and quadrature signals are used and a multiphase notch filter circuit is used with a frequency dependent response function that has a notch on a single side of zero frequency. The use of multiphase signals enables a single sided notch. The single sided notch ensures unique parameter values for tuning the filter. Apart from calibration the single sided notch may also ensure that a minimum of the signal spectrum is lost. In an embodiment notch filter control settings for a plurality of selected frequency positions may be determined in the calibration mode. This enables an adaptable frequency dependence of notch filter tuning The parameters may be notch filter control setting values for a plurality of frequencies for example, or parameters of a function that defines notch filter control setting values as a function of frequency. In an embodiment the reception branch comprises an automatic gain control circuit (AGC) coupled between the analog notch filter and the analog to digital converter. By placing an AGC behind the notch filter, amplification may be added wherein effects of the interference on gain control are reduced. In an embodiment an AGC may also be present before the notch filter, but the gain of that AGC will be limited due to the interference. In this embodiment the AGC behind the notch filter may provide additional gain once the interference has been reduced by the notch filter. In a further embodiment the control circuitry switches to an interference detection mode before receiving data and set the automatic gain control circuit to a minimum gain when in said interference detection mode. In this way the interference frequency may be determined with a minimum of signal artefacts due to the AGC. In a frame based reception signal, the predicted start time of a next frame may be used to select a time interval in advance of that predicted start time, for switching to the interference detection mode.

In an embodiment the digital Fourier transformer and the inverse digital Fourier transformer comprise a common transformation computation core. Alternatively, separate computation cores may be used. Preferably, the same clock source is used for defining sample time points for generating and sampling transmission and reception. This reduces effects of clock signal dependence of the calibration.

In an embodiment frequency window is defined comprising the interference frequency. Frequency components in said window are suppressed from an output signal of the Fourier transformer before deriving demodulated data. It has been found that the interfering signal will affect a number of frequencies in spite of notch filtering. In a further embodiment a version of the output signal of the Fourier transformer without suppression of the frequency components in the window is monitored to control deactivation of the notch filter when the interfering signal disappears.

BRIEF DESCRIPTION OF THE DRAWINGS

These and other objects and advantages will become apparent from a description of exemplary embodiments, using the following figures.

DESCRIPTION OF EMBODIMENTS

Figure 1:
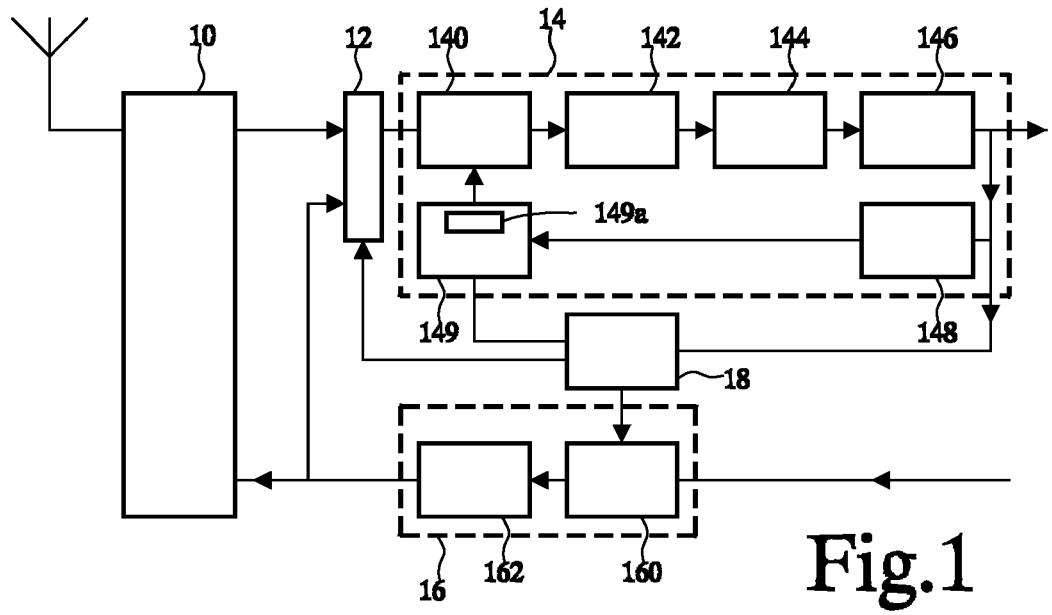
FIG. 1, 1a shows a transceiver circuit

FIG. 1 shows a transceiver circuit comprising a front end 10, a multiplexer 12, a reception branch 14, a transmission branch 16 and a calibration control circuit 18. Multiplexer 12 has inputs coupled to outputs of front end 10 and transmission branch 16. Multiplexer 12 has an output coupled to an input of reception branch 14.

Reception branch 14 comprises an analog notch filter 140, an automatic gain control circuit 142 (AGC), an analog to digital converter 144 (ADC), a Fourier transformer 146, coupled successively in series between the input and an output of reception branch 14. As used herein a notch filter is a filter with a frequency dependent response that drops to zero, or near zero (a level significantly below its value for a majority of the frequencies), at an isolated notch frequency. Typically, a notch filter 140 is a filter with a response function that is frequency independent for frequencies far from the notch frequency and dips to near zero at the notch frequency. In terms of the complex frequency plane the notch filter typically has a combination of at least one zero at a complex frequency with a real frequency part equal to the isolated notch frequency and a zero or small imaginary part (damping) and a corresponding number of poles with the same real part and a larger imaginary part (damping). Typically, the imaginary part of the complex frequency of the zero is as small as feasible in view of manufacturing tolerances, say at least ten times smaller than the isolated notch frequency.

Furthermore, reception branch 14 comprises an interference detector 148 and a notch filter control circuit 149. Interference detector 148 has an input coupled to an output of Fourier transformer 146 and an output coupled to notch filter control circuit 149. Notch filter control circuit 149 has an output coupled to a control input of analog notch filter 140. In addition to automatic gain control circuit 142 (AGC) behind notch filter 140, a further automatic gain control circuit (not shown) may be provided between the input and notch filter 140.

Transmission branch 16 comprises an inverse Fourier transformer 160 and a digital to analog converter 162 (DAC) coupled in series between an input and the output of transmission branch 16. Calibration control circuit 18 has an input coupled to the output of Fourier transformer 146 and outputs coupled to control inputs of multiplexer 12, notch filter control circuit 149 and inverse Fourier transformer 160. The input of transmission branch 16 and the output of reception branch 14 may be coupled top a baseband processing circuit (not shown). In an embodiment a low pass filter may be included after DAC 162, coupled at least between DAC 162 and multiplexer 12, to suppress aliasing. Digital to analog converter 162 (DAC) and analog to digital converter 144 (ADC) receive clock signals from a common clock reference circuit that determines at least the sampling frequencies of the DAC and the ADC based on the same clock signal.

Interference detector 148, notch filter control circuit 149 and calibration control circuit 18 form control circuitry for controlling the use of notch filtering. Separate circuit units may be used to realize this control circuitry, but alternatively interference detector 148, notch filter control circuit 149 and calibration control circuit 18 may be combined in a single unit.

In operation, during normal reception, multiplexer 12 passes a received analog signal from front end 10 to ADC 144 via analog notch filter 140 and AGC 142. ADC 144 converts the analog signal into a digital signal and Fourier transformer 146 computes Fourier transform coefficients of a segment of the received signal.

When an interfering signal is present, interference detector 148 detects the interference and its frequency from the Fourier transform coefficients. Typically, the interference shows itself as a large coefficient for one, or a limited number of frequencies, with zero or much smaller coefficients at other frequencies. In response to detection interference detector 148 signals the frequency of the interference to notch filter control circuit 149.

In response notch filter control circuit 149 activates analog notch filter 140 and adapts the position of the notch to the detected frequency of the interference. As a result, the strength of the interfering signal will be considerably reduced relative to signals at other frequencies when the signal arrives at AGC 142. Hence, AGC 142 will be able to amplify the signal further than if the interference was not suppressed. Not all of the gain needs to be provided by AGC 142. In an embodiment a further AGC (not shown) may be provided in front of notch filter. Such an AGC may provide pre-amplification, but its gain may be limited by interfering signal strength. In this case AGC 142 is able to provide additional gain without introducing significant distortion. Additionally further digital filtering may be performed to reduce relative interference strength after analog to digital conversion.

In an embodiment notch filter control circuit 149 comprises a memory 149a for storing parameters that define notch filter control signal settings as a function of the detected interference frequency. The parameters may be notch filter control signal settings for respective frequencies or parameters of a function that defines the settings as a function of frequency, for example. In one example a function $F(f)=s0+A*f$ may be used, where f is the interference frequency. In this example s0 and A are parameters stored in the memory 149a. Calibration control circuit 18 is configured to switch the transceiver to a calibration mode. In the calibration mode calibration control circuit 18 controls multiplexer 12 to act as a loop-back circuit passing an output signal from transmission branch 16 to reception branch 14. Calibration control circuit 18 applies successive sets of coefficient values corresponding to interfering signals at respective frequencies to inverse Fourier transformer 160. Each set is used repeatedly, to generate signals for a plurality of successive time segments. During these time segments, calibration control circuit 18 causes notch filter control circuit 149 to apply a series of control signal settings to analog notch filter 140 until a setting has been found that results in a minimum interference output from Fourier transformer 146. Calibration control circuit 18 uses the settings that have been determined in this way to determine parameter values for use during normal reception, and causes notch filter control circuit 149 to store these parameters in memory 149a. In one example, settings for all interference frequencies are determined and stored in memory 149a. In another example, the parameters s0 and A are determined from two frequencies.

Any type of search may be used for determining the settings. In one embodiment all possible settings of the notch filter are scanned for each frequency, and the setting that leads to minimum detected output is used. In another embodiment iteratively adapted settings may be used. The selection of the settings may be performed at a time when no reception of normal signals is in progress. As a result, the time lost between the appearance of an interfering signal and the time at which a notch filter setting that suppresses the interfering signal can be minimized.

Figure 1A:
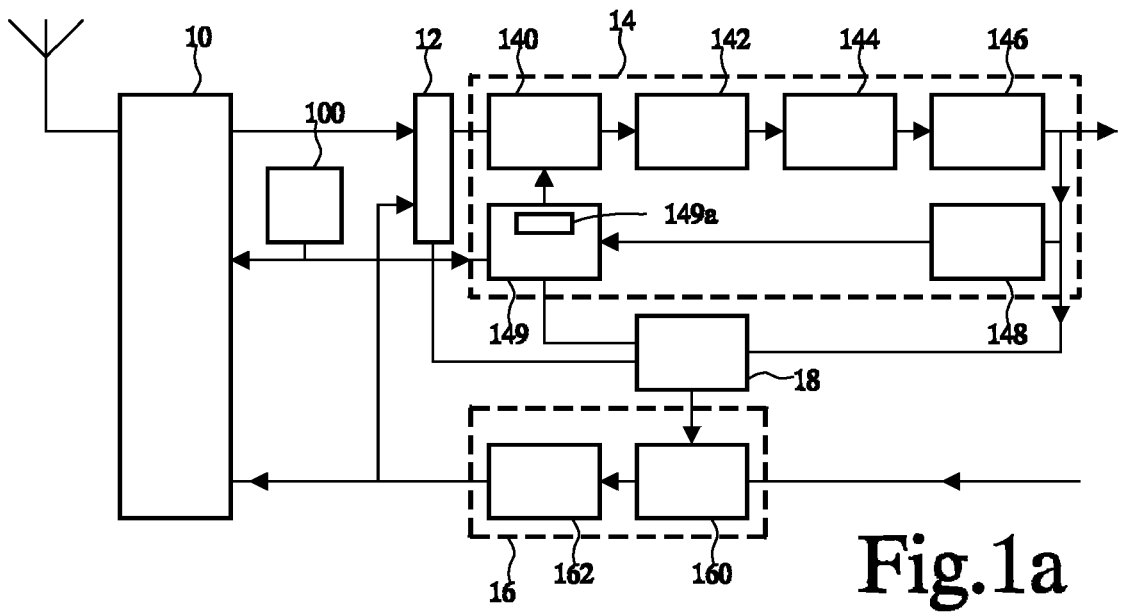

FIG. 1a shows an embodiment wherein frequency shifting reception is used. In this embodiment, the frequency of the incoming signal is shifted by time varying amounts. This may be realized by shifting a local oscillator frequency in front end 10 by such time varying amounts. In this embodiment, frequency shift control circuit 100 is provided with an output coupled to front end 10 and notch filter control circuit 149. Notch filter control circuit 149 is configured to select successive, different notch filter control settings and/or switch the notch on and off, dependent on signals from the frequency shift control circuit 100, in correspondence with the frequency shifts. Thus, the notch of analog notch filter 140 will be shifted each time by the amount of the frequency shift of reception, or the notch may be switched off when the location of the interfering frequency is moved out of band. A minimum of useful signals is lost after the appearance of interference, because no search is needed to find settings of the notch filter for all frequency shifts at the time of appearance of the interference. Because both generation of the calibration signal and detection use (inverse) Fourier transforms, calibration ensures that the parameter provide for correspondence between detected frequencies and notch setting.

Figure 2:
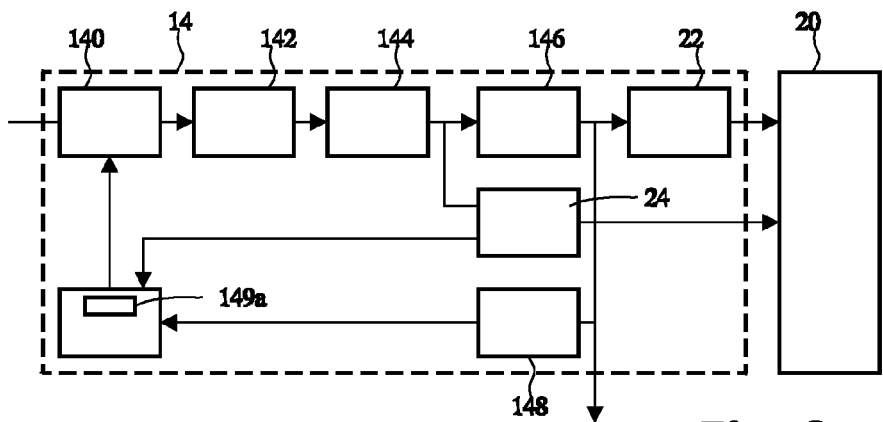
FIG. 2 shows a baseband processing circuit

FIG. 2 shows a baseband processing circuit 20 and an embodiment of reception branch 14 comprising an erase circuit 22 coupled in between Fourier transformer 146 and baseband processing circuit 20. Furthermore a correlator 24 is provided coupled between the output of ADC 144 and baseband processing circuit 20. Correlator 24 has an output coupled to notch filter control circuit 149. In operation frames comprising synchronization patterns are received. Correlator 24 operates both to detect the synchronization patterns and to detect a power level of the signal. Detection of synchronization patterns is used to select the time windows in the signal that contain the signal values to which the Fourier transform is applied. Moreover, correlator 24 controls deactivation of analog notch filter 140. Upon detecting a drop in signal power correlator 24 signals notch filter control circuit 149 to deactivate analog notch filter 140. In another embodiment correlator 24 is coupled between the output of Fourier transformer and baseband processing circuit 20, in parallel with erase circuit 22.

Erase circuit 22 is controlled by interference detector 148, to erase selected frequency components from the Fourier transformed signal. Interference detector 148 operates to select the frequency of the interference that is suppressed by analog notch filter 140 and to cause the coefficient at that frequency to be erased. In a further embodiment interference detector 148 operates to cause the coefficients for a window of frequencies comprising the interference frequency to be erased. Erase circuit 22 may have a further output coupled to baseband processing circuit 20 to indicate locations of erased frequencies to an error correction circuit (not shown).

Figure 3:
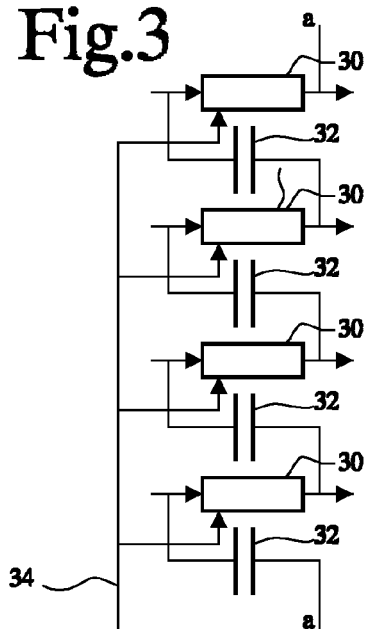
FIG. 3 shows an embodiment of an analog notch filter

FIG. 3 shows an embodiment of an analog notch filter. In this embodiment a complex filter is used, with four-phase inputs and outputs. The complex notch filter comprises controllable resistances 30, each for a respective phase and coupled between the input and the output for that phase. The resistances are control from a control input 34, coupled to the output of the notch filter control circuit (not shown) Furthermore the complex notch filter comprises capacitances 32, each for a respective phase and coupled from the input for that phase to the output for a ninety degrees more advanced phase. A receiver using such a notch filter is shown in FIG. 3a. Herein front end 10 has a quadrature output driven by the outputs from mixers 36a,b. Mixers 36a, b mix an input signal of front end with in phase and quadrature signals from a local oscillator 38. Although mixers 36a,b are shown directly connected to an antenna input, it should be understood that further circuits, such as a filter and/or a front end amplifier may be used between the input and the mixers. ADC 144 converts both real and imaginary signal components into a digital representation, of complex numbers which are used by Fourier transformer 146. Although a receiver without transmission branch and loopback multiplexer is shown, it should be appreciated that these may be added. In this case, the multiplexer may be configured to pass in-phase and quadrature signals from a selectable source. However, it may be appreciated that a transceiver, nor calibration as described in the preceding, is essential for use of a complex filter.

Figure 3B:
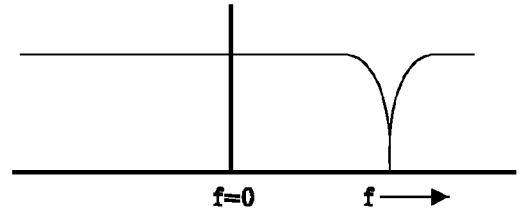
FIG. 3b shows an absolute value of a response function
Figure 3A:
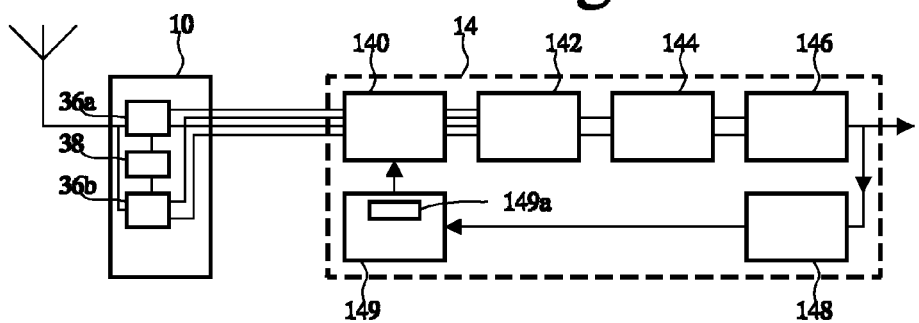
FIG. 3a shows a receiver with a complex notch filter

FIG. 3b shows an example of the absolute value of a response function of such a complex notch filter as a function of frequency. As may be noted, the function is asymmetric around zero frequency. This is possible because a complex analog notch filter is used. The use of a complex notch filter, that is, a notch filter that has in-phase and quadrature inputs and outputs, to represent real and imaginary parts of complex signals, and a transfer function for those complex signals that is not strictly real or strictly imaginary, has the advantage that a fewer channels are unnecessarily suppressed than in the case of a single phase filter. In addition, it makes it possible to reduce ringing effects of the notch filter. . The use of a complex notch filter may increase the search time needed to find a proper filter setting, but when calibration using loop-back is used, it can be voided that this leads to increased signal loss.

Although an example of an embodiment of a complex notch filter has been shown, it should be appreciated that other types of complex notch filter may be used, which may contain more resistances and capacitances, and/or other components. Although an example has been shown wherein only controlled resistances are used (implemented for example as FET channels controlled by gate electrodes), it should be appreciated that alternatively controllable capacitances or a combination of controllable capacitances and resistances may be used.

In an embodiment, calibration control circuit 18 is configured to deactivate notch filtering and reset AGC 142 during a predetermined time interval. Resetting of AGC 142 means that its gain is reset to a minimum. Interference detector 148 operates to detect interference, if any, from coefficients obtained by Fourier transformer 146 for a segment of the incoming signal during the time interval in which AGC 142 is reset. In this way, the risk is minimized that non-linear effects of AGC 142 affect the determination of the interference frequency. In an embodiment, the predetermined time interval is selected abutting the start of reception of a next frame. Calibration control circuit 18 may determine the start time of reception from the end time of reception of a previous frame, by adding a further time interval. In this way, loss of signal and power consumption can be minimized.

Although embodiments have been shown wherein separate units are used for various functions such as mode control, notch filter control, Fourier transforming, inverse Fourier transforming and baseband processing, it should be appreciated that part or all of these functions may be performed by the same circuit, for example by a programmable circuit under control of different parts of a program. Thus for example a programmable processor may be used to detect the presence of an interfering signal and its frequency from coefficients obtained by the Fourier transformation and the selection of the notch filter setting. This programmable processor may be also be used to switch the transceiver to the calibration mode and to determine setting values for various frequencies. The Fourier transformer, and the inverse Fourier transformer may be separate circuits, or they may be implemented with the same circuit, optionally using a buffer to store sampled signal values. In a further embodiment these transformers may be implemented in the programmable processor that performs control functions.

Although a multiplexer 12 has been shown as a loopback circuit, it should be appreciated that loopback can be realized in other ways, for example by a coupling circuit between the output of the transmission branch and an input of the reception branch that injects a transmission signal additively to signals from the front end. In this case calibration control circuit 18 may deactivate the transmitter branch during normal reception and activate it during calibration. In addition, front end 10 may be deactivated during calibration. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A wide band transceiver comprising
a receiver branch (14) comprising a tunable analog notch filter (140), an analog to digital converter (144) and a digital Fourier transformer (146) coupled in series;
a transmitter branch (16) comprising an inverse digital Fourier transformer (160);
a switchable loop-back circuit (12) coupled from the transmitter branch to an input of the notch filter;
control circuitry (148, 149, 18) coupled from an output of the digital Fourier transformer (146) to a tuning input of the notch filter (140), the control circuitry (148, 149, 18) comprising a memory (149a) for storing a parameter relating an interference frequency determined from a Fourier transform produced by the Fourier transformer (146) to a control signal of the notch filter (140) when in a normal operating mode, the control circuitry (148, 149, 18) being configured to switch the transceiver to a calibration mode, wherein the transmitter branch (16), the loop back circuit (12) and the receiver branch (14) are simultaneously active, to determine the parameter from a response of the Fourier transformer (146) at a selected frequency position to a signal from the transmitter branch generated by the inverse digital Fourier transformer (160) with a frequency component at the selected frequency position.

2. A wide band transceiver according to claim 1, comprising a quadrature mixing circuit (36a,b, 38), wherein the notch filter (140) is a multiphase filter circuit with a frequency dependent response function that has a notch on a single side of zero frequency.

3. A wide band transceiver according to claim 1, wherein the control circuitry (148, 149, 18) is configured to determine notch filter control settings for a plurality of selected frequency positions in the calibration mode.

4. A wide band transceiver according to claim 1, wherein the reception branch comprises an automatic gain control circuit (142) coupled between the analog notch filter (140) and the analog to digital converter (144).

5. A wide band transceiver according to claim 4, wherein the control circuitry (148, 149, 18) is configured to switch to an interference detection mode before receiving data, to set the automatic gain control circuit to a minimum gain when in said interference detection mode and to tune the analog notch filter according to the interference frequency detected in the interference detection mode.

6. A wide band transceiver according to claim 1, wherein the digital Fourier transformer (146) and the inverse digital Fourier transformer (160) comprise a common transformation computation core.

7. A method of receiving data with a transceiver circuit with a receiver branch (14) that comprises a notch filter (140) and a digital Fourier transformer (146), and a transmitter branch (16) comprising an inverse digital Fourier transformer (160), the method comprising:
switching the transceiver circuit to a calibration mode, wherein an output of the transmitter branch (16) is coupled to an input of the notch filter (140);
using the inverse digital Fourier transformer (160) to compute an inverse transform of a spectrum with a frequency component at a selected position;
applying a signal derived from the inverse transform to an input of the notch filter (140) in the calibration mode;
using the digital Fourier transformer (146) to Fourier transform an output signal of the notch filter (140);
determining a control setting of the notch filter to suppress the frequency component from an output of the digital Fourier transformer (146);
storing a parameter derived from said control setting in a memory (149a);
switching the transceiver circuit to a reception mode;
detecting a received interfering signal and an interference frequency of the received interfering signal;
using the stored parameter to translate the detected interference frequency into a control setting of the notch filter (140).

8. A method according to claim 7, wherein the notch filter (140) is a multiphase filter circuit with a frequency dependent response function that has a notch on a single side of zero frequency.

9. A method according to claim 7, comprising determining the notch filter control settings in the calibration mode for a plurality of selected frequency positions.

10. A method according to claim 7, wherein the transceiver comprises an automatic gain control circuit (142) between the notch filter (140) and the Fourier transformer (146), the method comprising determining a predicted start time of a frame of data, switching to an interference detection mode during a time interval an advance of the predicted start time, setting the automatic gain control circuit (142) to a minimum gain when in said interference detection mode and tuning the analog notch filter (140) for reception in the frame of data according to the interference frequency detected in the interference detection mode.

11. A method according to claim 7, comprising defining a frequency window comprising the interference frequency and suppressing frequency components in said window from an output signal of the Fourier transformer (146).

12. A method according to claim 11, comprising monitoring a version of the output signal of the Fourier transformer (146) without suppression of the frequency components in said window, detecting from said version whether the interfering signal remains present and deactivating the notch filter (140) upon detection that the interfering signal is no longer present.

* * * * *